INFRARED IMAGING SYSTEM COMPRISING AN ARRAY
OF IMMERSED DETECTOR ELEMENTS

Filed May 18, 1966

INVENTOR.
SEYMOUR L. WEINER
BY Joseph Levinson 3,397,314

INFRARED IMAGING SYSTEM COMPRISING AN ARRAY OF IMMERSED DETECTOR ELEMENTS

Seymour L. Weiner, Stamford, Conn., assignor to Barnes Engineering Company, Stamford, Conn., a corporation of Delaware Filed May 18, 1966, Ser. No. 551,100
11 Claims. (Cl. 250—83)

This invention relates to an infrared imaging system and more particularly to such a system which includes an immersed detector array in the system such that a plurality of contiguous elemental fields are provided to produce excellent field definition with minimal gaps and crosstalk between adjacent elemental fields of view.

Thermal imaging of a given field of view may be accomplished by scanning an infrared detector over the field of view which produces an electrical output in accordance with the temperature of the elemental field scanned by the detector. The speed with which the detector may be scanned over a given field of view is limited by the ability of the detector to heat up and cool down rapidly, so that meaningful outputs may be produced. In other words, the time constant of the detector must be sufficiently fast to be able to respond to temperature gradients in the field of view of the imaging system. Cryogenically cooled, single detectors have been used to provide the fast time constants required to produce desired sensitivity and angular resolution in rapid scanning systems. However, the cooled detectors suffer from the drawbacks of being expensive to operate and further from a lack of sensitivity in the far infrared region.

Thermal imaging systems have also been provided in mosaic form, in which the infrared detectors are deposited on substrates in spaced arrays. In such a case the detector area defines the elemental field of view which is focused upon the mosaic. Since these detectors are deposited on common substrates, if one is bad, the whole system must be discarded, and a new one substituted therefor. Due to the spacing between detector elements, angular resolution is poor. If the detector elements are moved close together, serious crosstalk problems arise, which reduces resolution of the imaging system.

It is an object of this invention to provide a new and improved infrared imaging system with excellent field definition.

A further object of this invention is to provide an infrared imaging system in which optical crosstalk between adjacent elemental fields of the field of view of the system is minimal.

Another object of this invention is to provide an infrared imaging system in which the field of view of each detector element in an array of detectors is closely spaced without the close spacing of detector elements.

Still another object of this invention is to provide an infrared imaging system in which the detector elements are of a smaller size, require lower biasing voltages, and provide greater optical gain.

Another object of this invention is to provide an infrared imaging system which is fast, with minimal optical aberrations and reduced power requirements.

In carrying out this invention in one illustrative embodiment thereof, an infrared imaging system is provided having a long focal-length optical means for defining the entrance aperture of the system. An array of infrared detectors is provided wherein each detector element in the array is immersed on an immersion lens. The immersion lenses of the array of infrared detectors are positioned in abutting relationship in the focal plane of the optical means, such that each lens acts as a field lens which images the entrance aperture of the system on its associated detector element to form continuous elemental fields of the entrance aperture. The array of infrared detectors is mounted in such a manner that any individual detector in the array may be removed without destroying the rest of the aray.

The invention, both as to organization and method of operation, together with further objects and advantages thereof, may best be understood by reference to the following description taken in connection with the accompanying drawings, in which.

Figure 1:
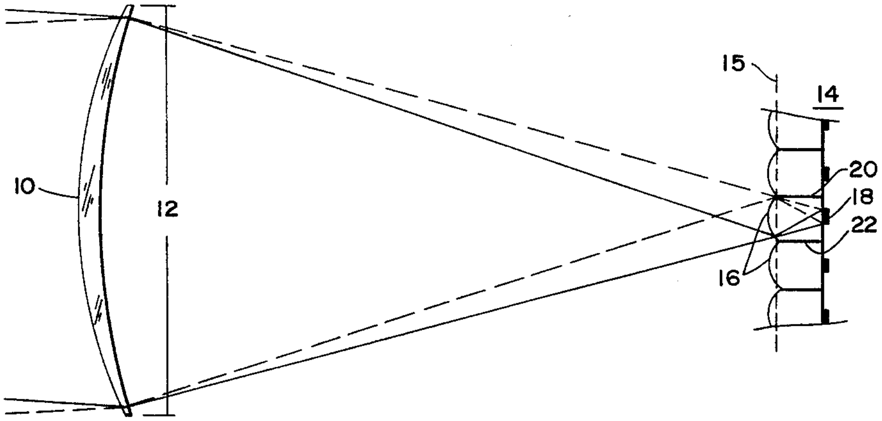
FIG. 1 is an optical schematic diagram of the infrared imaging system embodied in this invention.

Referring now to FIG. 1, a primary optical means 10 is provided for defining the entrance aperture 12 of the thermal imaging system. The primary optical means 10 is illustrated as being an objective lens, but it will be utilized, for example a totally reflective primary objective, understood that any type of optical means may be and it will be further understood that movable optical scanning mirrors may be used in combination therewith.

An array of immersed infrared detectors 14 is provided in which a detector element 18 is immersed in a conventional manner on an immersion lens 16 having edges 20 and 22. Although the invention is not restricted to any particular type of detector, it is particularly advantageous with the use of thermistor detectors, and will accordingly be described as such. The characteristics of the immersion lens material is one having high thermal conductivity, transparency to the infrared radiation which is to be detected, and a high refractive index. Although the invention is not restricted to any specific lens material, germanium and silicon are particularly suitable as immersion lens materials. Immersion is performed in the conventional manner of evaporating an immersion glass onto an optically flat surface of the lens; placing a small flake of thermistor material on the glass; heating the glass to the point where the glass becomes soft; and slowly cooling the assembly whereby the flake is embedded in the glass and therefore becomes attached to the immersion lens. In FIG. 1 a single immersed element is labelled with reference characters, but the elements are all the same and therefore would carry the same reference characters. The shape of the lens elements may be hemispherical or hyperhemispherical, and the shape thereof will depend on the design of the optical system. Also, the lenses may be so shaped that incoming energy does not exceed the critical angle. This will prevent optical crosstalk between adjacent lenses. The sides 20 and 22 of the lens 16 may be ground off, and are so shown on FIG. 1 to present a square elemental field stop for each individual thermistor flake 18. Each lens acts as an elemental field stop. The sides may also be provided with a radiation reflective coating to prevent crosstalk between the individual detector elements. This feature will be more fully discussed with respect to FIG. 4. As previously pointed out, the lens shapes per se could be used for this purpose.

An important facet of the present invention relates to the positioning of the infrared detector array 14 in the system. The focal plane 15 of the primary optical means 10 is made to fall near the surface of the immersion lenses 16. The immersion lenses 16 of the detector array 14 thus act as field lenses which image the entrance aperture of the system onto the thermistor flakes 18. Contiguous elemental fields are thus obtained by using the immersion lenses 16 rather than the normally used detector flakes 18 to define each elemental field for the detector. Contiguous elemental fields is defined as having spacing between adjacent fields of less than 10% of an individual elemental field. Spacings of 1% or less are achievable with the present invention. This configuration provides very sharp contiguous elemental fields of each detector element in the array, with minimal optical crosstalk. This is due to the fact that the elemental field demarcation occurs in the primary optic focal plane 15 where the optical aberrations of the primary optic are determined by the primary collecting optic $f$ number which can be quite slow. The field immersion lenses 16 only serve to direct energy coming through the field stop defined by the sides of the immersion lens onto the detector flake 18 so that any optical rays which miss the detector flake 18 due to the immersion lens optical aberrations serve only to slightly reduce the sensitivity of the system, rather than smear the elemental field sharpness. The optical gain provided by each immersion lens increases the system's effective optical speed to provide an over-all fast $f$ number. This results in detector flake dimensions which are small compared to the center-to-center dimensions of its associated immersion lens. In turn the small detector flakes allow for spatial separation between the individual detector elements, which minimizes any electrical crosstalk due to electrical pickup between detector elements.

Merely by way of example to illustrate the nature of the thermal imaging system, by use of a 1 mm. diameter immersion lens along with a flake size of .1 x .1 mm. detector element, elemental fields of the order of 1 x 1 milliradian are achievable when combined with a primary collecting focal length of 40 inches. The optical power provided by each immersion lens increases the system's effective speed so that it approaches $f/0.21$. This example is given merely to illustrate the relative sizes of the elements contemplated. It will be appreciated that larger diameter lenses may be used and flake sizes down to .03 x .03 mm. are achievable. The particular lens and detector sizes will ultimately depend on the particular application of the imaging system and on the performance desired.

When using thermistor flakes as the immersed detector elements, a small detector flake size provides a considerable advantage. Since the thermistor bolometer operates on a principle of changing resistance in accordance with incident radiation, the smaller the detector flake size, the more rapid the response to incident radiation and the less bias voltage that is required. This substantially reduces the power requirements for the thermistor detector array.

Figure 2:
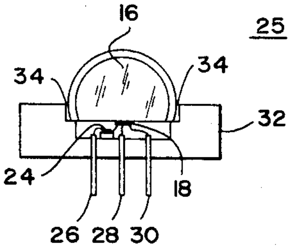
FIG. 2 is a front elevational view of a single detector element of the array shown in FIG. 1.
Figure 3:
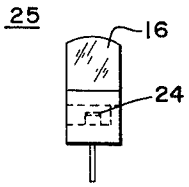
FIG. 3 is a side view of the single detector element shown in FIG. 2.

In order to minimize the rejection rate due to a faulty detector element within the immersed detector array, and to facilitate repairs, the array 14 is fabricated using separate replaceable immersed detector elements. One such element is illustrated in FIGS. 2 and 3. A single detector 25 is comprised of an immersion lens 16 having an active thermistor flake 18 immersed thereon, and a compensating flake 24. The lens 16 and its associated flake 18 are mounted in a detector mounting block 32 of high thermal conductivity to provide a heat sink for the unit, and may be made of copper, aluminum, or any other suitable high heat-conductivity material. A compensating flake 24 is mounted on the block 32 as shown in FIG. 3. The compensating flake 24 and the active flake 18 are connected in a conventional bridge arrangement by conductors 26, 28 and 30, which are provided with insulated sleeves such as glass bonded into the mounting block 32 in order to insulate the leads from the mounting block. The lead connections between each immersed flake and its compensating flake can be made from either side of the mounting block opening and the detector and signal leads are routed through the bottom of each block 32.

The immersion lens 16 is secured to flanges in the block 32 by use of cement at points 34 to insure good thermal conductivity between the lens 16 and the block 32.

Figure 4:
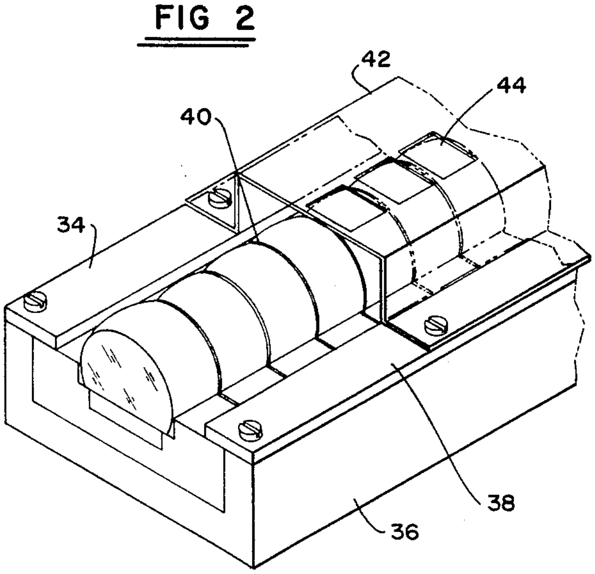
FIG. 4 is an isometric view showing one form of mounting for an array of detector elements of the type shown in FIG. 2.

The individual detector assemblies 25 are then mounted in an array mounting block 36 as shown in FIG. 4. The individual detector mounting blocks 32 are assembled on the array mounting block 36 with the connector leads being fed through holes in the bottom of the array mounting block 36. Each detector assembly 25 is held to the array mounting block 36 by hold-down plates 34 and 38. If desired, an additional field stop 42 having openings 44 therein may also be mounted over the detectors on the array mounting block 36. A shield 40 may be placed between adjacent immersion lenses to minimize optical spillover between adjacent immersion lenses, and it may also serve as electrical shielding to minimize electrical pickup between adjacent detector elements. The shield may be in the form of a reflecting coating such as gold, which is positioned between the abutting lens edges. The shield is thin enough so that it will not interfere with the contiguous elemental field relationship provided by the detector array in the system. It may be applied on the ground-off lens edges by painting, evaporation, or any other suitable technique, or may be a separate element. In the event of the failure of a single detector element, the hold-down plates are removed and the faulty detector element lifted out and replaced without destroying the array.

The infrared imaging system may be utilized for single or dual axis scanning. The time to complete such scans can be reduced by a factor which is a function of the number of detectors in the array as compared to the single detector element system. This may be accomplished without degrading the scanner's sensitivity. The reduction in scan time would allow the use of uncooled immersed detector arrays to be competitive in sensitivity with high-speed scanning thermal imaging systems with equivalent or better angular resolution to the cryogenically cooled single detectors which are utilized in rapid scanning systems.

Since other modifications varied to fit particular operating requirements and environments will be apparent to those skilled in the art, the invention is not considered limited to the examples chosen for purposes of disclosure, and covers all modifications and changes which do not constitute departures from the true spirit and scope of this invention.

What I claim as new is:

1. An infrared imaging system using a plurality of contiguous elemental fields which provide excellent field definition with minimal cross-talk and minimal gaps between adjacent elemental fields, comprising (a) a long focal length optical means defining an entrance aperture for the infrared imaging system, (b) an array of infrared detectors, (c) each of said detectors in said array having a detector element immersed on an immersion lens, (d) said immersion lenses being positioned in abutting relationship and in the focal plane of said optical means such that each lens acts as a field lens which images the entrance aperture of the system on its associated detector element to form contiguous elemental fields of the entrance aperture with minimal gaps between the elemental fields.

2. The infrared imaging system set forth in claim 1 wherein said lenses are hemispherical or hyperspherical in shape.

3. The infrared imaging system set forth in claim 1 wherein mounting means are provided for said array wherein each infrared detector in said array is individually removable therefrom.

4. The infrared imaging system set forth in claim 3 wherein said mounting means comprises (a) a detector mounting block for each infrared detector in said array which has good thermal conductivity, (b) means for mounting an infrared detector in each detector mounting block with the immersion lens in good thermal contact therewith, (c) an array mounting block, and (d) removable means for securing said detector mounting blocks in abutting relationship which positions the detectors in abutting relationship to form said array whereby said detectors are individually removable from said array.

5. The infrared image system set forth in claim 1 which includes cross-talk prevention means for enhancing optical separation between the contiguous elemental fields.

6. The infrared image system set forth in claim 5 wherein said cross-talk prevention means comprises a radiation reflecting coating on the abutting lens edges.

7. The infrared image system set forth in claim 5 wherein said cross-talk prevention means comprises the immersion lenses which are shaped such that radiation imaged thereon by said optical means does not exceed the critical angle.

8. An immersed infrared detector array in which the individual immersed infrared detectors are removable without destroying the entire array, comprising (a) a plurality of immersed infrared detectors each having an immersion lens and a detector element immersed thereon, (b) a detector mounting block for each of said immersed infrared detectors which has good thermal conductivity, (c) means for mounting an immersed infrared detector in each detector mounting block with the immersion lens in good thermal contact therewith, (d) an array mounting block, and (e) removable means for securing said detector mounting blocks in abutting relationship in said array mounting block thereby forming an abutting array of immersed infrared detectors which are individually removable from the array so formed.

9. An immersed infrared detector array as set forth in claim 8 which includes cross-talk prevention means for enhancing optical separation between said detectors.

10. An immersed infrared detector array as set forth in claim 9 wherein said cross-talk prevention means comprises a radiation reflecting coating on the abutting lens edges.

11. An immersed infrared detector array as set forth in claim 9 wherein said cross-talk prevention means comprises the immersion lenses which are shaped such that radiation imaged thereon does not exceed the critical angle.

No references cited.

ARCHIE R. BORCHELT, *Primary Examiner.*